(12) United States Patent
Branke et al.

(10) Patent No.: US 6,227,616 B1
(45) Date of Patent: May 8, 2001

(54) CHILD SEAT

(75) Inventors: Ute Branke, Kircheim/Teck; Bernd Rager, Bissingen/Teck; Rene Heller, Mengen-Rulfingen; Achim Frey, Geislingen/Steige; Toni Kober, Waiblingen; Heiko Malsch, Heiningen; Ingo Schulze, Esslingen; Peter Bertenburg, Elchingen; Jurgen Lachenmann, Nurtingen, all of (DE)

(73) Assignee: Recaro GmbH & Co., Kirchheim/Teck (DE)

( * ) Notice: Subject to any disclaimer, the term of this patent is extended or adjusted under 35 U.S.C. 154(b) by 0 days.

(21) Appl. No.: 09/284,094

(22) PCT Filed: Jul. 14, 1998

(86) PCT No.: PCT/DE98/02012

§ 371 Date: Apr. 7, 1999

§ 102(e) Date: Apr. 7, 1999

(87) PCT Pub. No.: WO99/07573

PCT Pub. Date: Feb. 18, 1999

(30) Foreign Application Priority Data

Aug. 7, 1997 (DE) ............................... 197 34 104
Dec. 13, 1997 (DE) ............................... 197 55 523
Dec. 13, 1997 (DE) ............................... 197 55 524
Dec. 13, 1997 (DE) ............................... 197 55 522

(51) Int. Cl.[7] .................................................. A47C 1/08
(52) U.S. Cl. ................................. 297/256.1; 297/250.1; 297/284.11; 297/284.9
(58) Field of Search ......................... 297/250.1, 256.1, 297/256.13, 284.1, 284.9, 378.1, 313, 483, 484, 452.4

(56) References Cited

U.S. PATENT DOCUMENTS

| 423,698 | * | 3/1890 | Pimsoll . |
|---|---|---|---|
| 1,830,119 | * | 11/1931 | Marshall . |
| 4,304,384 | * | 12/1981 | Cremer et al. . |
| 4,401,343 | * | 8/1983 | Schmidt . |
| 4,874,203 | * | 10/1989 | Henley . |
| 4,915,447 | | 4/1990 | Shovar . |
| 5,123,673 | * | 6/1992 | Tame . |
| 5,346,279 | * | 9/1994 | Pecorella . |
| 5,380,063 | * | 1/1995 | Dauphin . |
| 5,653,504 | * | 8/1997 | Henson . |

FOREIGN PATENT DOCUMENTS

| 2 128 927 | 12/1972 | (DE) . |
|---|---|---|
| 91 02 850 | 5/1991 | (DE) . |
| 41 40 638 | 6/1993 | (DE) . |
| 0 049 680 | 4/1982 | (EP) . |
| 0 200 411 | 12/1986 | (EP) . |
| 0 640 508 | 8/1994 | (EP) . |
| 1 539 731 | 9/1968 | (FR) . |
| 2 256 364 | 12/1992 | (GB) . |
| WO 94/04389 | 3/1994 | (WO) . |

* cited by examiner

Primary Examiner—Milton Nelson, Jr.
(74) Attorney, Agent, or Firm—Alston & Bird LLP (57) ABSTRACT

A child seat, in particular for a motor vehicle, has a seat-surface structure, which extends generally in a longitudinal direction and defines the seat surface, and a backrest. One part of the seat-surface structure can be adjusted and secured in the longitudinal direction relative to those remaining parts of the seat-surface structure which define the seat surface. A substructure that carries the seat-surface structure is operative so that the inclination of the seat-surface structure can be adjusted relative to the substructure. A belt-retaining device is carried by the backrest and operative in one operating mode to clamp the seatbelt, in response to the seatbelt traveling in a first pulling direction, and to release the seatbelt, in response to the seatbelt traveling in a second pulling direction. In another operating mode, the belt-retaining device loosely surrounds the seatbelt.

26 Claims, 11 Drawing Sheets

CHILD SEAT

BACKGROUND OF THE INVENTION

The invention relates to a child seat, in particular a child seat for a motor vehicle.

A multiplicity of children's seats are known. The most frequent are so-called bucket seats whose components, which comprise the seat part, backrest and head restraint, are assembled from half shells. Adapting the size to a growing child is allowed to some extent in that the distances of the shell parts from one another can be changed. However, the shell parts themselves are generally, as plastic parts, of rigid design and therefore only permit slight adaptation to the growing child. In the long term the seats are not comfortable and do not satisfy the orthopedic requirements. The child is held either by the child seat's own belt or by a seat belt of the vehicle seat on which the child seat has been placed. Although the second variant better transfers those forces which act upon the child into the vehicle in the event of a crash, smaller children, in particular, can only inadequately be held in the child seat in the event of slow movements because of the flexibility of the seat belt.

It is accordingly an object of the present invention to provide an improved child seat.

SUMMARY OF THE INVENTION

The above and other objects and advantages of the present invention are achieved by the provision of a child seat having a seat-surface structure connected to a back rest, wherein the seat-surface structure defines a seat surface having a length extending in a longitudinal direction. An adjustable portion of the seat-surface structure can be moved in substantially the longitudinal direction and secured relative to a second portion of the seat-surface structure that at least partially defines the seat surface.

The seat surface can be lengthened (or shortened) by virtue of the fact that one part of the seat-surface structure can be adjusted and secured in the longitudinal direction relative to those remaining parts of the seat-surface structure which define the seat surface. This enables adaptation to the continuing growth of the child, in particular from nine months to twelve years. The child is then able to hang his legs down comfortably over the end of the seat surface, while being securely supported, or place them on the seat surface, depending on the length of his legs. The adaptation can most simply be carried out on the child seat when it is not installed and can occasionally be changed depending on the growth rate of the child. In a preferred, simple design of an adjustable seat surface of this type, the adjustable part of the seat-surface structure is designed as a hoop which, guided by guide bushes, can be moved within a region of displacement, the guide bushes preferably being fastened to lateral parts of the child seat.

It is advantageous if a securing device is provided in the region of the seat surface, which securing device releasably secures the adjustable part of the seat-surface structure relative to the remaining parts thereof. A preferred, simple and, at the same time, stable structure results if the securing device releasably connects the hoop to at least one crosspiece running between two side parts of the seat-surface structure. The securing device can be attached at its front end by a socket to the hoop. With a plurality of ribs in its rear region for attaching it to the crosspiece, the securing device provides the option of securely holding the hoop, at different distances from the crosspiece.

In accordance with another aspect of the invention, the securing device can be pivoted about the hoop, with the socket as a bearing, so as to release the securing device. So that the securing device does not inadvertently become detached from the hoop or become wedged elsewhere, the pivoting region of the securing device is preferably restricted by means provided on the seat-surface structure and/or by means provided on the securing device. One such means can form the mat which is fixed in the seat-surface structure for the purpose of supporting the padding.

The securing device is advantageously designed at the same time as a ramp which rises from the rear to the front so that the child does not dive under the seat-belt in the event of the vehicle decelerating sharply.

An increase in seat comfort results from the inclination of the seat-surface structure being adjustable relative to the substructure. An adjustment of the inclination in a space-saving manner is possible if during the adjustment of the inclination the seat-surface structure is pivoted about a spatial shifting axis of rotation. This can be realized, for example, by the seat-surface structure having bearing bolts which are guided in slotted guides of the substructure. Alternatively, other guide parts could also be guided in corresponding slotted guide links.

In principle, numerous adjustments of the inclination are possible. However, for a simple and nevertheless comfortable design of the child seat it is sufficient for the seat-surface structure to be able to be secured in an essentially upright sitting position and an inclined sleeping position. In the case of the preferred design with bearing bolts it is possible, for example, for the securing to take place at least partially by the bearing bolts engaging into latching recesses of the slotted guides. In addition, a further securing in the sleeping and/or sitting position can take place by means of at least one pivotable latch which locks a bearing bolt in place. The preference for the upright sitting position because of the inherent weight of the child seat is possible if during the transfer from the sitting position into the sleeping position, the bearing bolts are moved obliquely upward into at least partially rising regions of the slotted guides, and the seat-surface structure is also raised as a result.

In order to obtain better sliding properties and to reduce the wear, the bearing bolts can be guided in separately formed sliding guides which function as the slotted guide, wherein the sliding guides are inserted into cutouts in the side walls of the substructure. The sliding guides are preferably made of a harder material than the side walls.

As a result of the fact that the backrest has a belt-retaining device which, in at least one operating mode, clamps a seatbelt in one pulling direction and releases it in the other pulling direction, the seatbelt can be fastened easily and securely on the child seat and can be removed again. With appropriate accessibility to the belt-retaining device it is also possible for the seatbelt to be introduced into the belt-retaining device without having to actuate the latter by hand.

The belt-retaining device advantageously has at least one pivotable, eccentrically mounted belt retainer with which the required asymmetry in both possible pulling directions is achieved. When the seatbelt bears against the belt retainer, it preferably carries along the latter in the event of being pulled. This is assisted if the belt retainer has increased friction at least over part of its outer surface. To improve the putting-on of the seatbelt, the belt retainer preferably has a rounded portion on its free end. Clamping is more simple if the belt retainer is spring-loaded in a pivoting direction and is pretensioned relative to a part of the belt-retaining device. In order to be able to fasten the child seat on the left or right on any vehicle seat, the belt-retaining device preferably has a respective belt retainer on the left and on the right side of the child seat.

In a second operating mode, which is preferably used for older children, the belt-retaining device loosely surrounds the seatbelt. This is advantageously achieved by the belt-retaining device having a pivotable projection which, when it bears against a part of the belt-retaining device, forms an annularly closed opening for the seatbelt. This projection may, for example, be provided on the free end of the belt retainer.

If the belt-retaining device has, as a supporting part, a hoop which is arranged on the backrest, this results in simple and cost-efficient production.

As an option for adapting the child seat to the growing child and to increase the safety and comfort, the child seat according to the invention can have a seat surface which can be changed in length, a changeable inclination and also a belt retainer. However, it can also be fitted with only one of these options or with any desired combination of two options.

A further option for adapting the child seat to the growing child results if lateral supports which can be adjusted and secured in height and/or width, i.e. in the distance from the seat surface or with respect to each other, are provided on the backrest. Lateral supports of this type not only retain the child in the event of a lateral impact but also while the child is sleeping. If a hoop is provided for the belt-retaining device, said hoop is preferably fastened to the supporting means of the lateral supports, i.e. in the event of there being an option for height adjustment it can likewise be simultaneously displaced in height.

For easy transport of a child seat which is not in use, for example in the trunk of the motor vehicle, it is advantageous if the backrest can be folded forward relative to the seat-surface structure.

BRIEF DESCRIPTION OF THE DRAWINGS

The invention is explained in more detail with reference to three exemplary embodiments illustrated in the drawing, in which.

DETAILED DESCRIPTION OF THE PREFERRED EMBODIMENT

When installed a child seat is fastened on a motor-vehicle rear-seat bench. All of the following directional data are derived from the direction of travel of the motor vehicle in which the child seat is installed, and its normal alignment.

Figure 1:
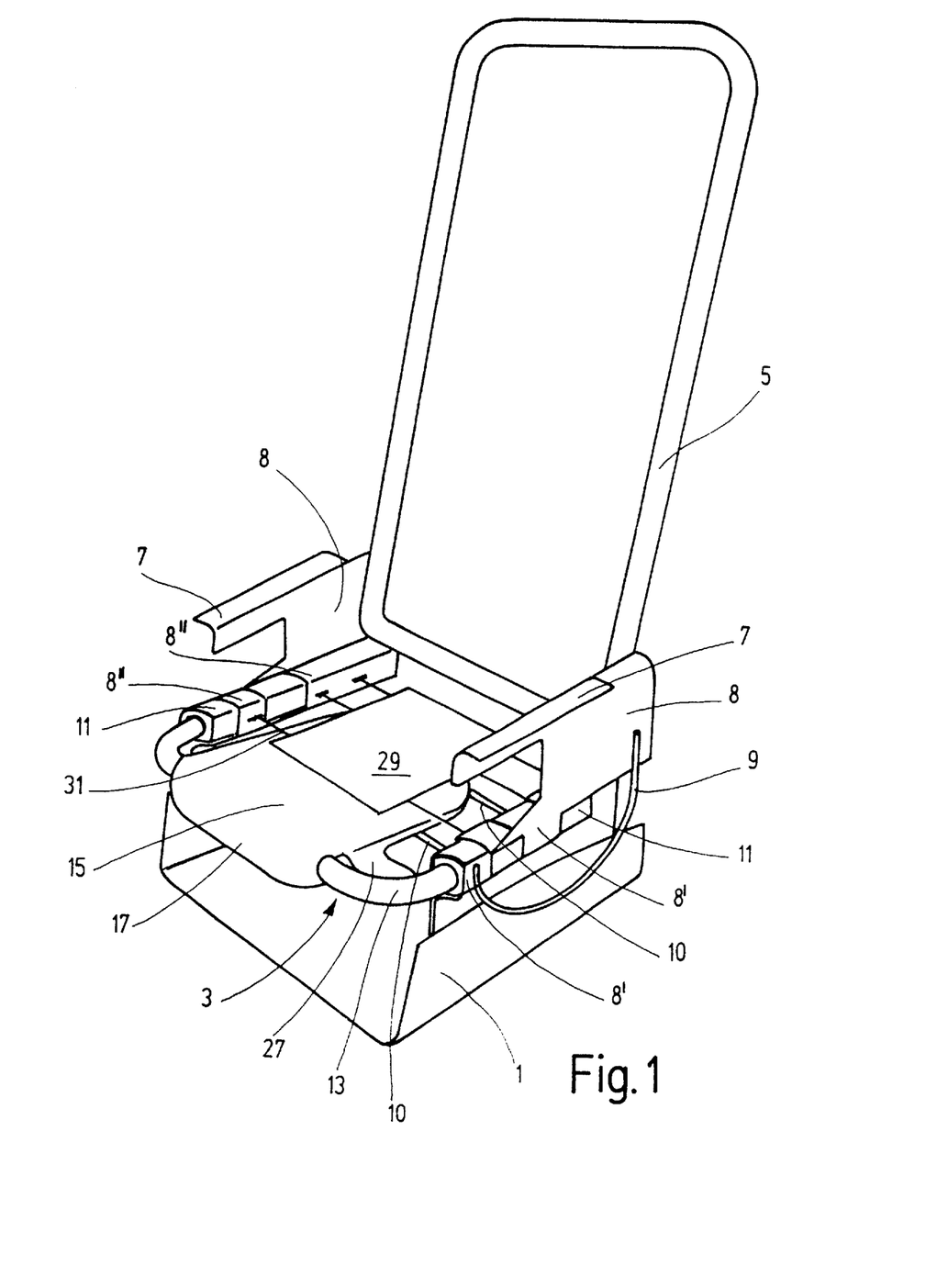
FIG. 1 shows a perspective view of a first child seat according to the invention without the padding and covering.
Figure 2:
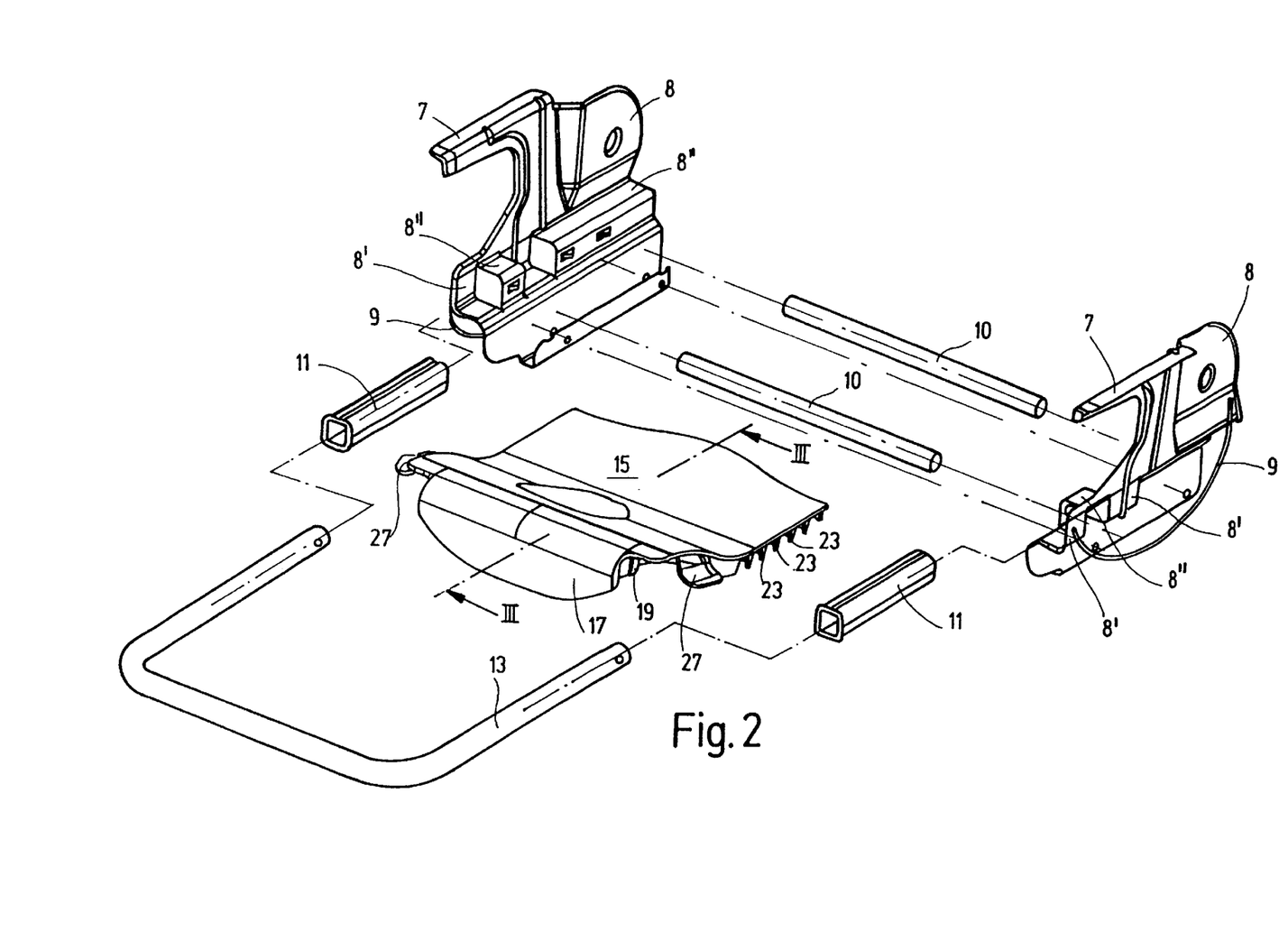
FIG. 2 shows a perspective view of various components of a seat-surface structure of this first child seat.

In the first exemplary embodiment, the child seat has a substructure 1 with which the child seat is supported on the seat surface of the rear-seat bench. A seat-surface structure 3 is arranged on the substructure 1. The supporting means of a backrest 5 is arranged on the seat-surface structure 3 but could also be arranged on the substructure 1. To the left and right of the seat-surface structure 3 are arranged armrests 7 which are preferably connected to the seat-surface structure 3. The upper side of the seat-surface structure 3, the front side of the backrest 5 and the upper and inner sides of the armrests 7 are padded, which is not illustrated in the drawing. The above-mentioned parts are also covered by material coverings which are likewise not illustrated.

The seat-surface structure 3 has a respective side part 8 on the left and right, which side part is preferably produced as a metallic punched and bent part. The two side parts 8 are of mirror-inverted design and are connected to one another via two crosspieces 10 to form a seat frame. The two crosspieces 10 are preferably designed as cylindrical tubes and are attached, preferably screwed or welded, in the lower region of the side parts 8. To facilitate the attachment, the lower edge of the side part 8 is bent inward and then upward and is provided with two notches in which the crosspieces 10 are placed during assembly. That upper region of each side part 8 which is pulled forward and is partially bent outward simultaneously forms the support of the armrest 7. On the outside each side part 8 is provided in the lower region with a tube 9 which is bent in a U shape, points downward and around which the covering of the armrest 7 is fixed downward.

The side part 8 is provided somewhat below its center with an inwardly pointing shoulder which runs in the longitudinal direction. The shoulder is formed in this case by two parts 8' of the side part 8, which parts first run downward, then run inward at a right angle and then again run downward at a right angle, and is also formed, in a sectionally alternating manner with the latter, by two further parts 8" of the side part 8 which first run inward at a right angle and then run downward at a right angle. The parts 8' and 8", which are bent out in different ways, enclose in this case a channel which has a virtually square cross-section and is open to different sides.

This channel has inserted into it a guide bush 11 which is preferably made of plastic, is open to the front and rear and around its front opening has a bead which serves as a stop for the front part 8' of the side part 8 when the guide bush 11 is inserted into the channel. On the lower side the guide bush 11 furthermore has a projection by which it engages, after the insertion, behind the rear part 8' of the side part 8 and is thus secured against displacement. A hoop 13, which is bent in a U shape and is made from a tube, preferably an aluminum tube, is introduced by a respective leg from the front into a guide bush 11, those ends of the legs which project behind the guide bushes 11 being prevented from again being pulled forward by the guide bushes 11 by the insertion of a respective stopper with latching projections.

Figure 3:
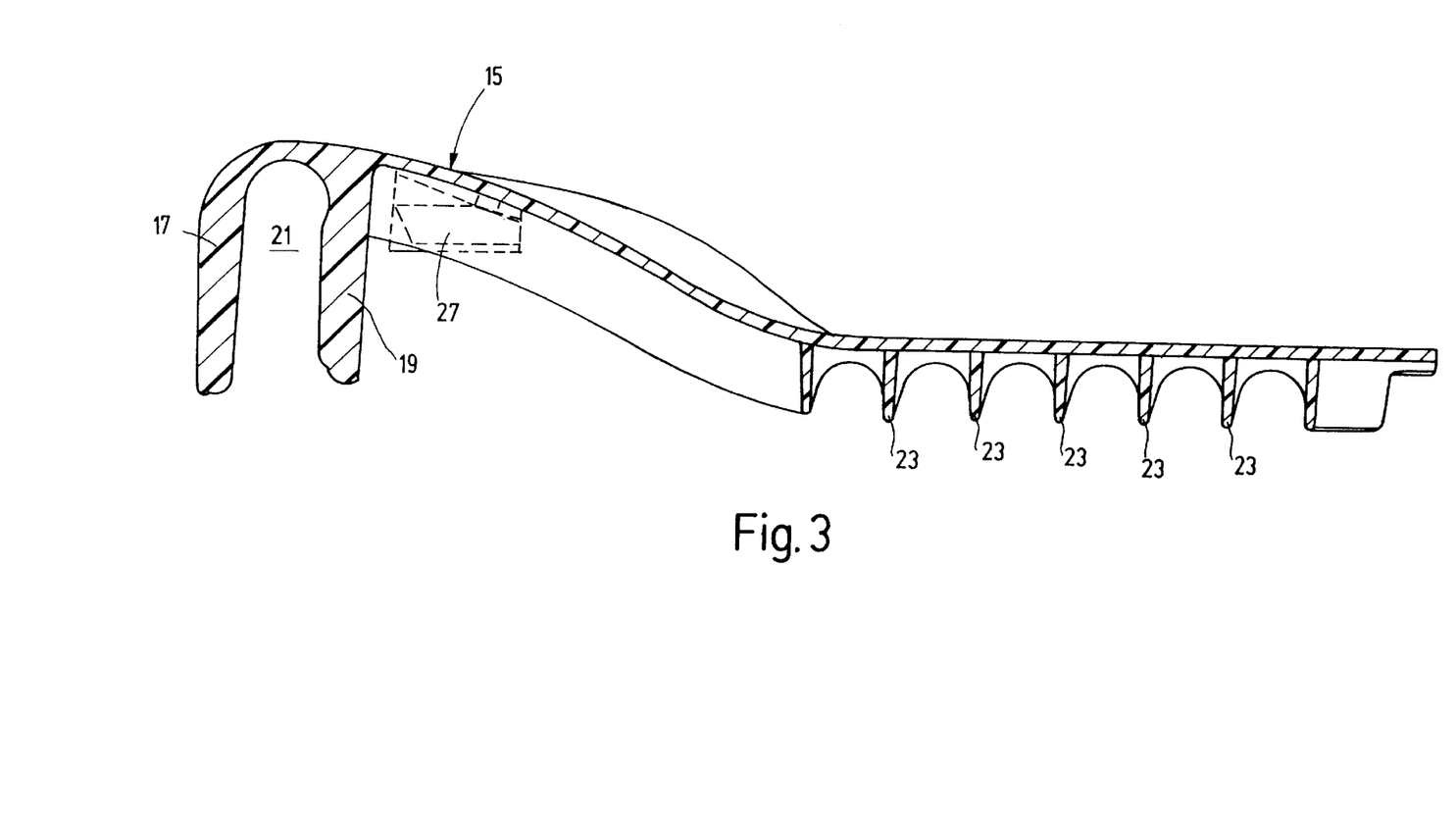
FIG. 3 shows a section through a ramp according to the line III—III in FIG. 2.

A ramp 15, which is preferably made of plastic and rises slightly from the rear to the front, is designed such that it is mirror-symmetrical with respect to the longitudinal direction. On the upper side, approximately in the center, the ramp has a hump which later comes to lie between the legs of the child. At the front end, the ramp 15 is provided with a gripping portion 17 which is bent downward and runs in the transverse direction. The rear side of the gripping portion 17 and a single rib 19 which runs parallel to the latter and protrudes downward from the lower side of the ramp 15, form a socket 21 which has a virtually U profile and is open downward. The ramp 15 is placed with the socket 21 onto that part of the hoop 13 which runs transversely, this part of the hoop 13 being lightly gripped behind by the gripping portion 17 and the single rib 19 in the manner of a clip connection.

On the lower side in its rear region the ramp 15 has a plurality of parallel ribs 23 between which are respectively defined downwardly open grooves having a semicircular profile. The ramp 15 is fitted in this rear region into the front crosspiece 10, which runs between the two side parts 8, in such a manner that the crosspiece 10 comes to lie between two ribs 23. As a result, the ramp 15 acts as a securing device which releasably secures the hoop 13 relative to the fixed parts of the seat-surface structure 3, in particular the side parts 8. Depending on the arrangement of the ramp 15 in each case, the rear crosspiece 10 can likewise come to lie between two ribs 23.

In the front region of the ramp 15, the latter has, on the left and right side, two mirror-inverted lugs 27 which are of integral design with the ramp and first run in a J shape from the ramp 15 downward and then are bent outward. The lugs 27 are arranged with their ends underneath those parts of the hoop 13 which run to the rear. As long as the ramp 15 rests upon the crosspiece 10, the lugs 27 bear against the hoop 13 with a slight pretension.

A mat 29 is arranged in the center of the seat-surface structure 3 above the ramp 15. The mat 29 consists of rubber and textile parts connected to one another and is fastened under pretension on each side to the side parts 8 by three clips 31. For the fastening into those regions of the parts 8'' which run downward, the side parts 8 have bent-out eyelets for the clips 31, specifically, one eyelet in the front part 8'' and two eyelets in the rear part 8'''.

Together with the front part of the ramp 15, the mat 29 supports the padding for the seat surface, i.e. together with the side parts 8 and the hoop 13 it defines the seat surface. The covering for the seat surface is fastened behind the rear end of the mat 29, for example on the rear crosspiece 10, runs forward and downward over the gripping portion 17 and is then replaced by strips of rubber which are finally fastened again to the rear end of the covering via textile adhesive fastenings.

To change the length of the seat surface, the user releases the covering, grips the gripping portion 17 and pivots the ramp 15 a short distance upward around the hoop 13 as an axis, the socket 21 forming the bearing for the hoop 13 during the pivoting movement. The pivoting movement is restricted in that the rear end of the ramp 15 comes to bear against the lower side of the mat 29. The ramp 13 is prevented from being inadvertently lifted off the hoop 13 by the lateral lugs 27 which bear under pretension against the hoop 13. As the ramp 15 pivots upward, the ribs 23 are released from the crosspiece 10.

If the ramp 15 is pivoted upward, the hoop 13 can be moved within the guide bushes 11. The seat length results from the position of the hoop 13 in the longitudinal direction relative to the remaining parts of the seat-surface structure 3. If the desired seat length is reached, the user pivots the ramp 15 downward again until the crosspiece 10 again comes between two ribs 23, and the ramp 15 is thus again supported on the rear end. The covering is then pulled taut again and fastened.

The ramp 15 is prevented from inadvertently pivoting upward while the child seat is in use by the mat 29 during use being pressed downward, in the extreme case as far as the ramp 15, with the result that the ramp 15 has no space available to undertake a pivoting movement, and furthermore by the lugs 27 bearing against the hoop.

Figure 4:
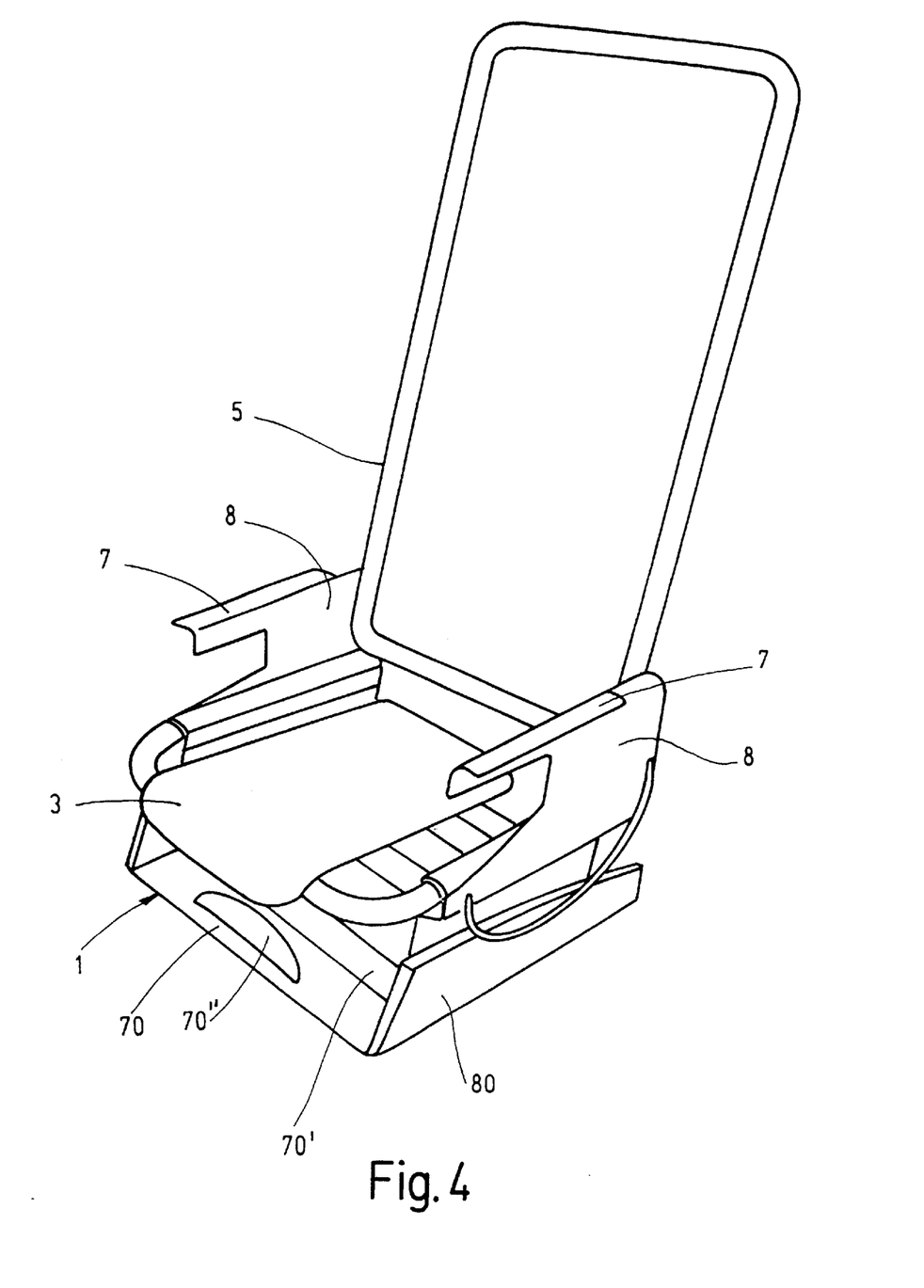
FIG. 4 shows a perspective view of a second child seat according to the invention without padding and a covering.

In the second exemplary embodiment, the child seat has a substructure 1 with which the child seat is supported on the seat surface of the rear-seat bench. A seat-surface structure 3 is arranged on the substructure 1. The supporting means of a backrest 5 is arranged on the seat-surface structure 3 but could also be arranged on the substructure 1. To the left and right of the seat-surface structure 3 are arranged armrests 7 which are preferably connected to the seat-surface structure 3, for example via side parts 8. The upper side of the seat-surface structure 3, the front side of the backrest 5 and the upper and inner sides of the armrests 7 are padded, which is not illustrated in the drawing. The abovementioned parts are also covered by material coverings which are likewise not illustrated.

Figure 5:
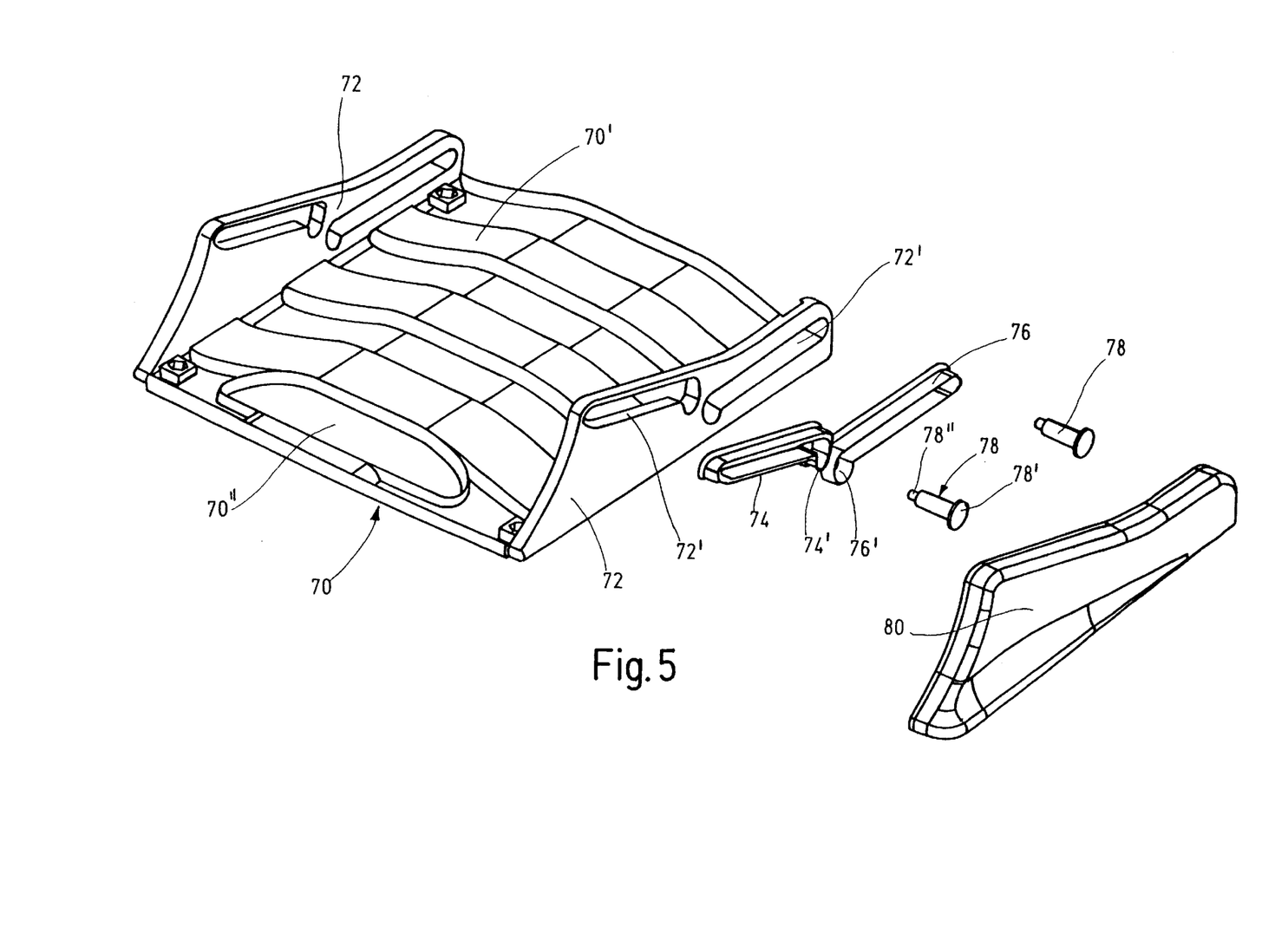
FIG. 5 shows a perspective view of various components of a substructure of this second child seat.

The substructure 1 comprises a virtually square baseplate 70 which, to the left and right, is in each case provided with a side wall 72 which is of integral design with the baseplate 70 and is drawn upward. The baseplate 70 together with the side wall 72 is preferably made of plastic. For stability reasons the baseplate 70 is provided on the upper side with three flat, transversely extending ribs 70' on whose lower side the baseplate 70 has corresponding depressions. In the front edge region in the baseplate 70 there is left open a gripping opening 70'' which serves for taking hold of the child seat.

Figure 6:
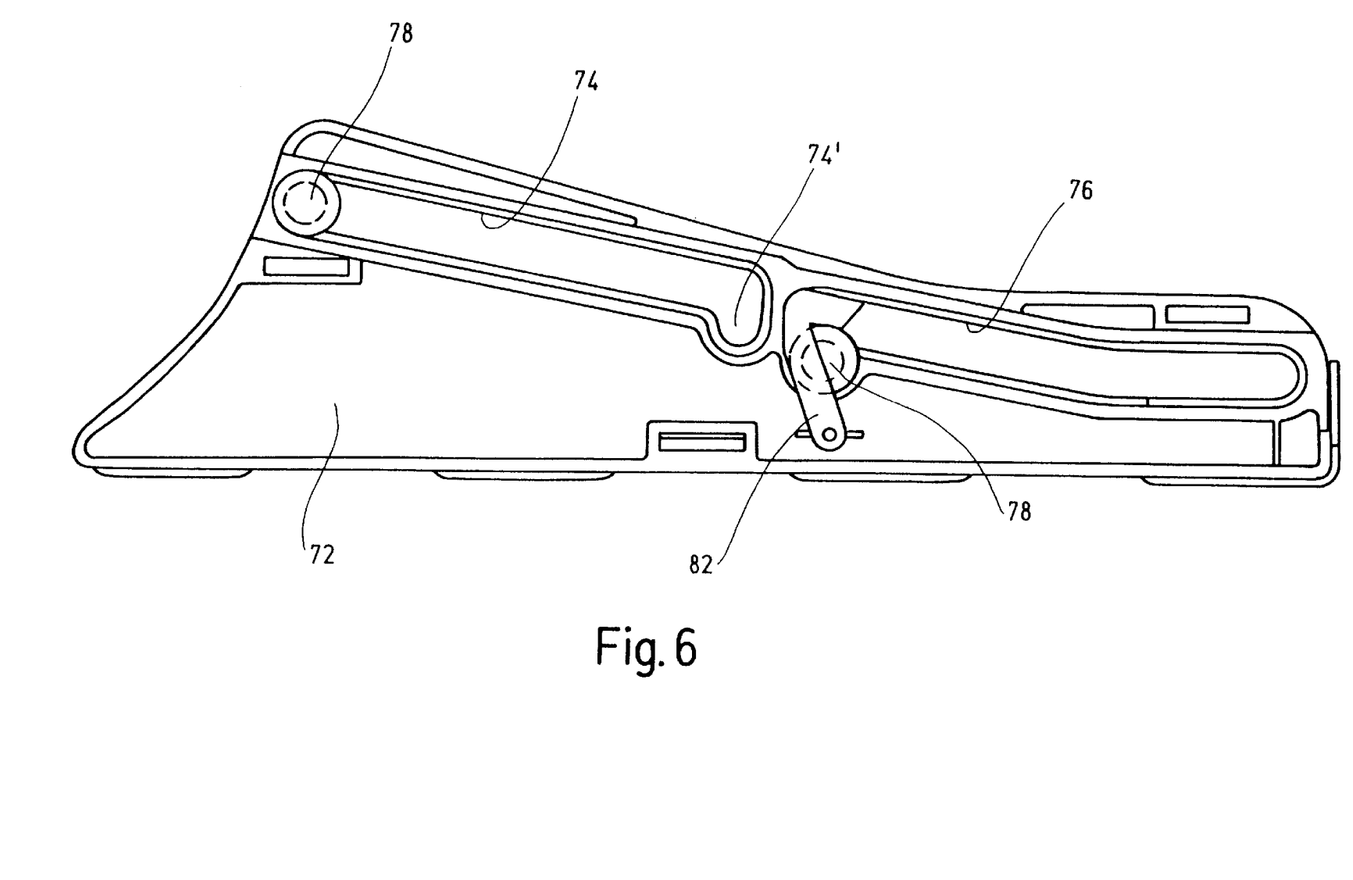
FIG. 6 shows a side view of the left side wall of the substructure of this second child seat without a surround piece that cover the side wall.

The upper edge of each side wall 72 runs in the rear quarter approximately horizontally, then rises forwards at an angle of approximately 15° and then falls quickly down onto approximately a sixth of the length of the side wall 72 as far as the baseplate 70. In the vicinity of the upper edge, the side wall 72 has two cutouts 72' which penetrate the side wall 72 in the transverse direction, run in the longitudinal direction and at the same time rise slightly.

Inserted in the front of these cutouts 72' is a front sliding guide 74 which is made of plastic, is designed in the manner of a shape formed from a closed band of constant width and on the inwardly pointing edge has a bead or shoulder as a stop for the insertion into the cutout 72'. When installed, the front sliding guide 74 has an elongated part which rises forward at an angle of approximately 10°, has parallel walls at the top and bottom and at the front is provided with an end section which points in the same direction and is rounded semi-cylindrically. At the rear end the front sliding guide 74 is provided with a latching recess 74' which points downward away from the elongated part and is rounded approximately semi-cylindrically.

In the rear of these cutouts 72' there is inserted a rear sliding guide 76 which is designed in the same manner as the front sliding guide 74 and is likewise made of plastic. When installed, the rear sliding guide 76 has an elongated part which has parallel walls at the top and bottom, is provided at the rear with an end section which points horizontally to the rear and is rounded semi-cylindrically, and in the rear the said part runs virtually horizontally and then rises forward at an angle of approximately 15°. At the front end the rear sliding guide 76 is provided with a latching recess 76' which points downward away from the elongated part and is rounded approximately semi-cylindrically.

Figure 7:
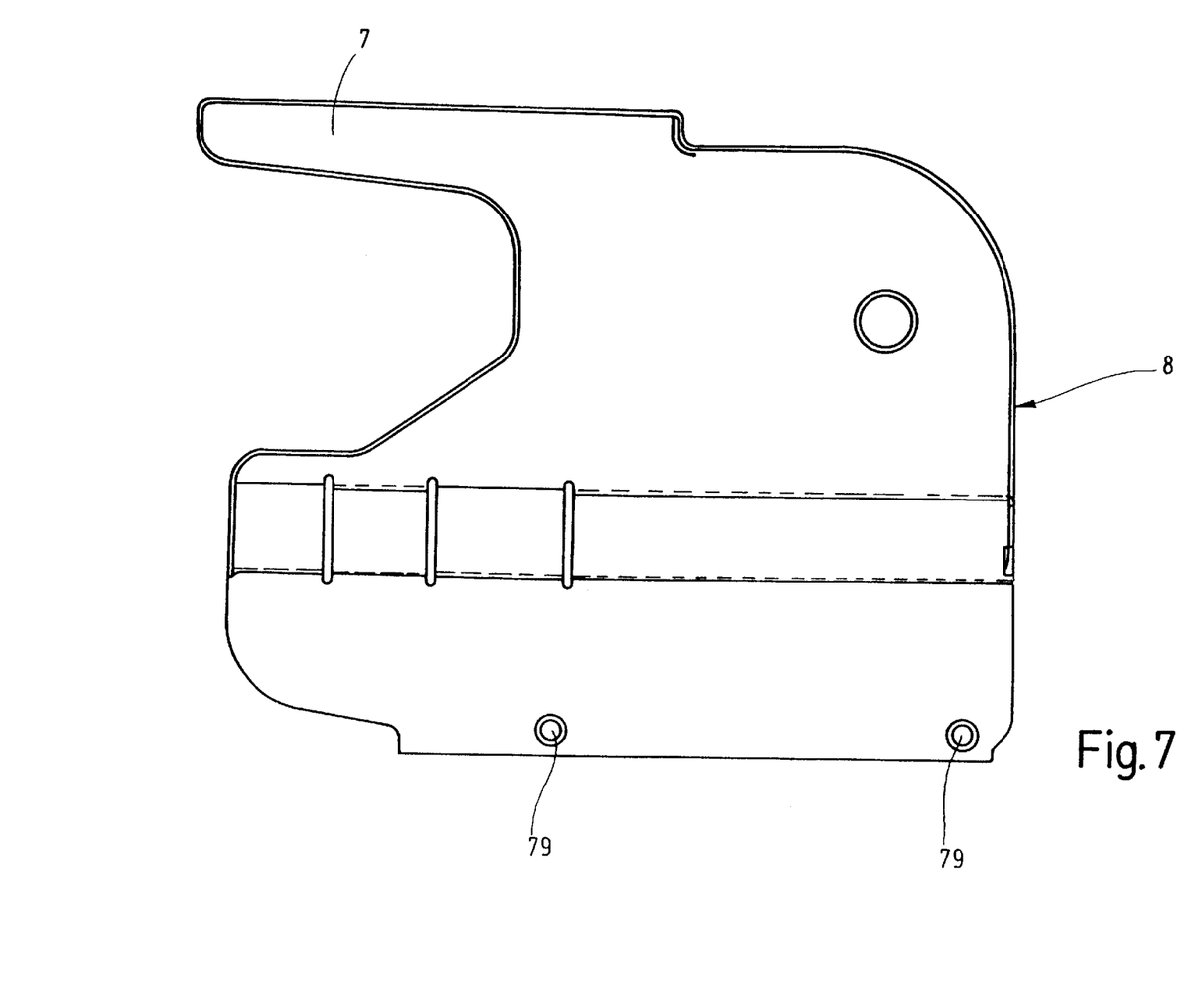
FIG. 7 shows a side view of the left side part of the seat-surface structure of this second child seat.

Four essentially cylindrical bearing bolts 78 are provided at one end with a flat, disc-shaped head 78' of relatively large diameter and at the other end with a coaxial peg 78" of smaller diameter than the remaining bearing bolts 78. The horizontal bearing bolts 78 are pushed through the sliding guides 74 and 76 in such a manner that the head 78' is arranged on the outside of the side wall 72 and thereby retains the associated bearing bolt 78 toward one side in the sliding guide 74 or 76. By means of the pegs 78" the bearing bolts 78 are fitted into holes 79 in the side parts 8 or, if they have a thread, are screwed in and are thereby protected toward the other side. The side parts 8 form supporting parts of the seat frame and, at the same time, of the seat-surface structure 3. The outer surface of each side wall 72 is covered by a plastic surround 80 which is designed such that it fits and is preferably fastened to the side wall 72 via a clip connection.

The inclination of the upper parts of the child seat, i.e. the seat frame with the seat-surface structure 3 and the backrest 5, can be changed relative to the substructure 1. In an essentially upright sitting position of the child seat, the bearing bolts 78 are situated at the rear ends of the sliding guides 74 and 76 which are designed as slotted guides, the front bearing bolts 78 being arranged in the latching recess 74' of the front sliding guides 74 and the sitting position being secured thereby, assisted by the inherent weight of the child seat.

Starting from this, the child seat is grasped at the seat-surface structure 3 and pulled forward and slightly upward. The front bearing bolts 78, which are fastened to the side parts 8 of the seat-surface structure 3, move out of the latching recesses 74' and obliquely upward in the front sliding guide 74 which acts as a ramp. At the same time, the rear bearing bolts 78 move forward and slightly upward along the rear sliding guide 76. The change in inclination does not involve a pivoting movement about a positionally fixed axis of rotation but rather an imaginary pivoting movement about an imaginary, horizontal, transversely running axis of rotation which moves downward and slightly forward during the change in inclination so that the child seat does not have to be removed from the rear-seat bench for the change in inclination. As soon as the bearing bolts 78 arrive at the front ends of the bearing guides 74 and 76, the rear bearing bolt 78 can engage into the rear latching recess 76' because of the inherent weight of the child seat. The sleeping position is thereby reached.

In order additionally to secure the sleeping position, a latch 82 is provided, for example, on the left side of the substructure 1, which latch can be pivoted about a horizontal axis of rotation which runs parallel to the bearing bolts 78 and below the rear latching recess 76'. The latch 82 is mounted in the side wall 72, is arranged between the latter and the surround 80 and is opened rearward. The dimensions of the latch 82 are selected in such a manner that it can slightly engage around the head 78' of the left, rear bearing bolt 78 from above, if it is in the rear latching recess 76', and thereby lock it in place. The latch 82 can be spring-loaded toward the securing position and can be pressed on or pulled on by means of a lever or a Bowden cable. It can also be designed in a manner such that, when the seat-surface structure 3 is grasped, the latch is at the same time pivoted back for the transfer into the sitting position.

A corresponding latch can be provided for the additional securing of the sitting position, in order, for example, on the opposite side of the child seat to lock the right, front bearing bolt 78 in place when it engages into the front latching recess 74'.

In the third exemplary embodiment, the child seat has a substructure 1 with which the child seat is supported on the seat surface of the rear-seat bench. A seat-surface structure 3 is arranged on the substructure 1. The supporting means of a backrest 5 is arranged on the seat-surface structure 3 but could also be arranged on the substructure 1. To the left and right of the seat-surface structure 3 are arranged armrests 7 which are preferably connected to the seat-surface structure 3, for example via side parts 8 (FIGS. 1, 2, 4 and 7). The upper side of the seat-surface structure 3, the front side of the backrest 5 and the upper and inner sides of the armrests 7 are padded, which is not illustrated in the drawing. The above-mentioned parts are also covered by material coverings which are likewise not illustrated.

Figure 8:
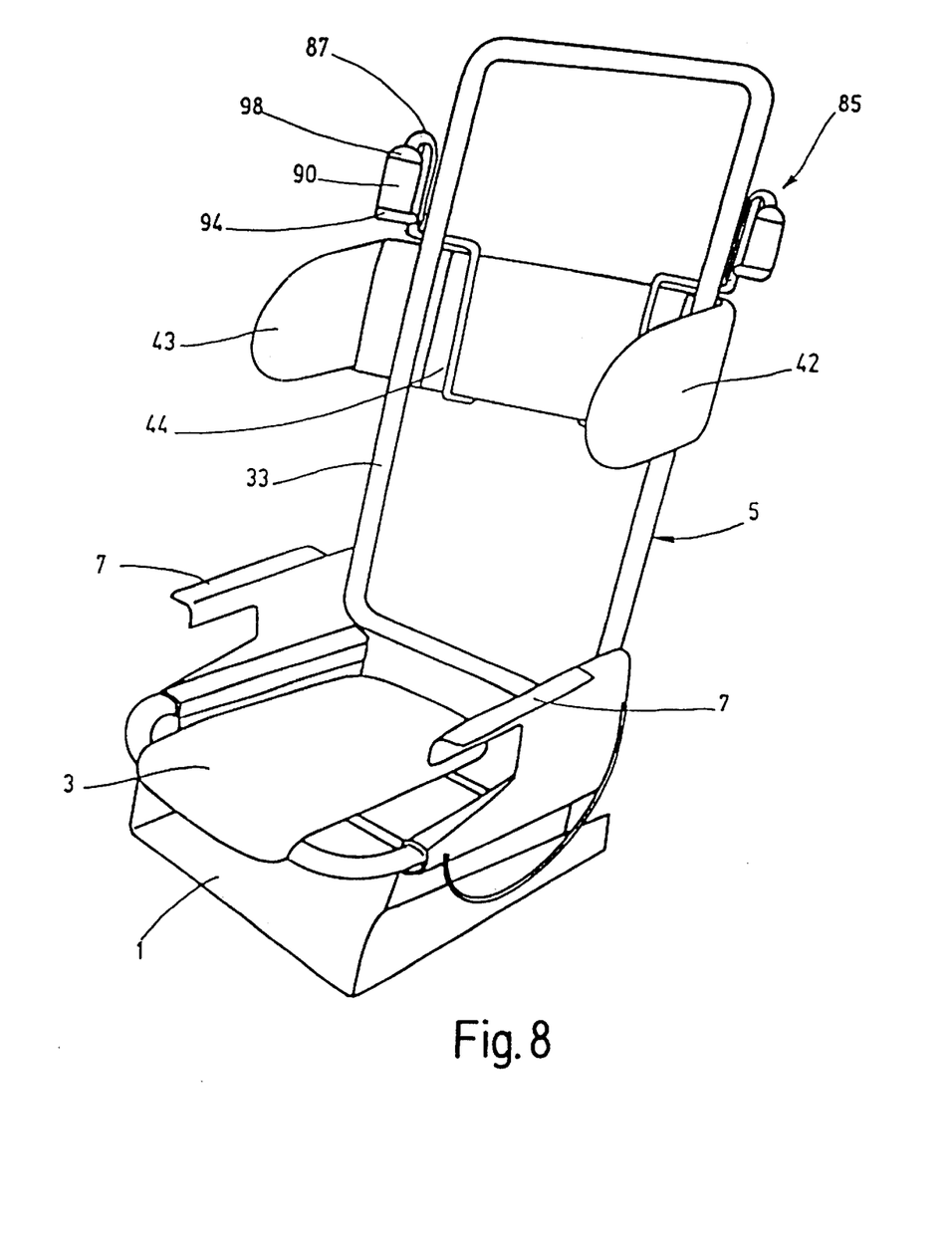
FIG. 8 shows a perspective view of a third child seat according to the invention without padding and a covering.
Figure 9:
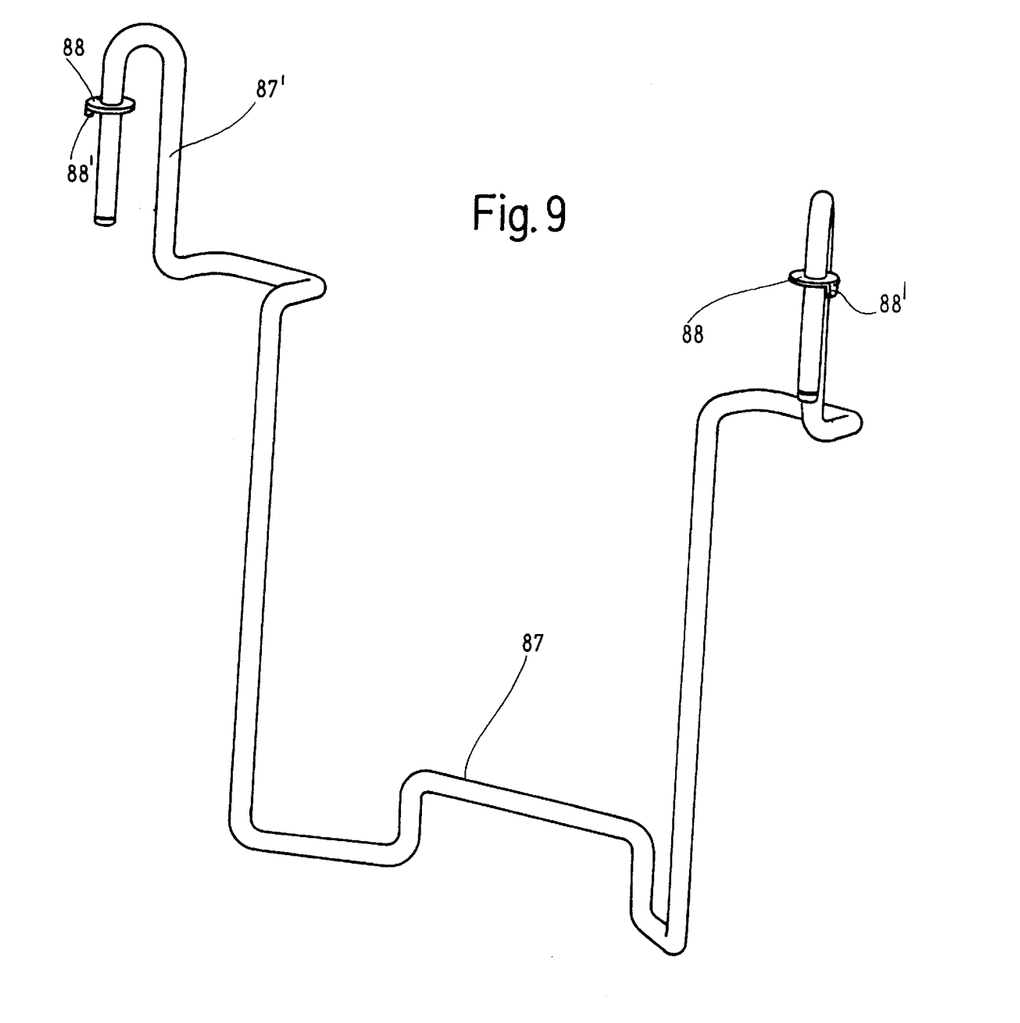
FIG. 9 shows a perspective view of a hoop of the belt-retaining device of this third child seat.

A belt-retaining device 85 is arranged on the backrest 5. The belt-retaining device 85 has a hoop 87 which consists, for example, of a steel tube of 8 mm diameter with 1 mm wall thickness. The hoop 87 is fastened to a supporting means 44 for lateral supports 42, 43 of the child seat, the supporting means 44 being displaceable in turn relative to the backrest 5 and being securable on the latter. The hoop 87 is bent to the left and right in a mirror-inverted manner. From the center, the hoop 87 initially runs transversely to the child seat, then downward, obliquely forward and again upward, in order to form a holder for the supporting means 44. After approximately two thirds of its height the hoop 87 runs to the rear, outward, and again forward in order to loop around a backrest strut 33 of the backrest 5. The hoop 87 then runs upward in a section 87', bends around with an alignment obliquely forward and then in an end section runs downward again in order to end in front of that section which loops around the backrest strut 33. Somewhat above its two ends a small plate 88 is pushed onto the hoop 87 and fastened, preferably welded, the plate bearing, toward the outside of the seat, a downwardly pointing tooth 88'.

Figure 10:
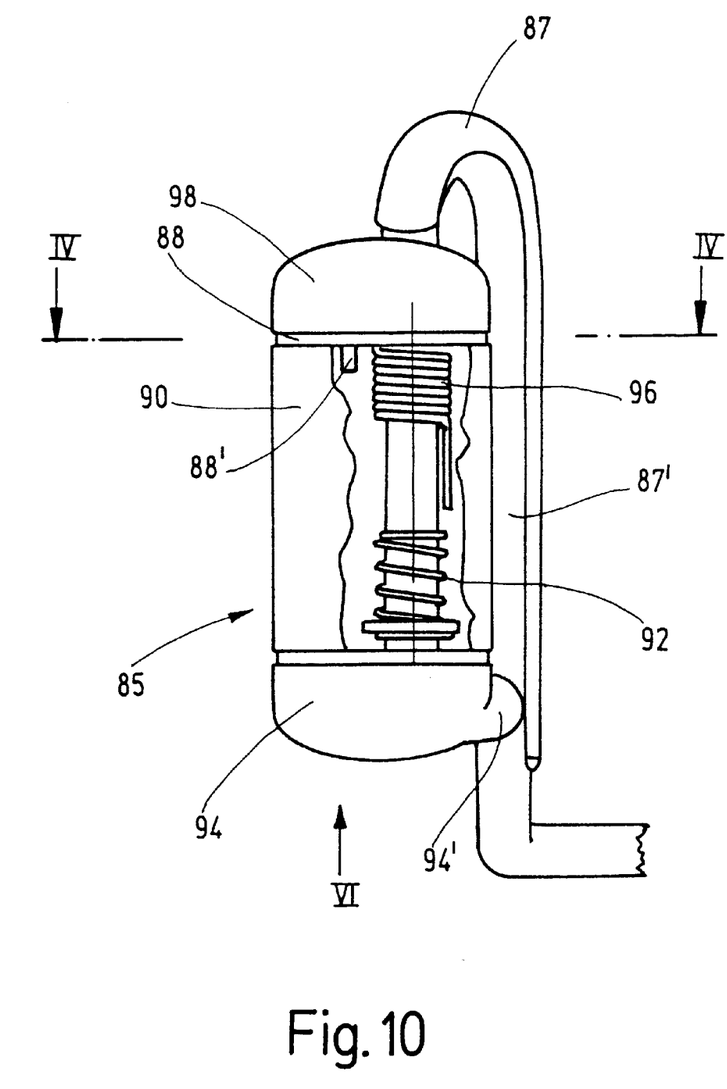
FIG. 10 shows a partially cut-away view of a belt retainer of this third child seat with caps, springs and hoop.

As a further part of the belt-retaining device 85 a respective belt retainer 90 of cylindrical design is pushed from below onto the end section of the hoop 87 and secured by a spring mechanism described later. Each end section of the hoop 87 is surrounded by a holder 91 of the belt retainer 90 and, at least over part of its length, supports the belt retainer 90. In this case, the holder 91 runs between the two end surfaces and parallel to the central axis of the belt retainer 90 so that the belt retainer 90 is thus mounted eccentrically. On the outside of its circumferential surface, the belt retainer 90 has a rubber coating for increasing the friction, and otherwise is made of plastic.

From the lower end side of the belt retainer 90 a lower spring 92 is introduced into the holder 91, wound around the hoop 87 and supported at its upper end on a shoulder of the holder 91. The lower end of the lower spring 92 is supported on the hoop 87, for example, on a spring ring which is seated in an annular groove at the end of the hoop 87. The lower spring 92 is pretensioned in the axial direction, in this manner downwardly secures the belt retainer 90 and presses it against the plate 88.

Figure 13:
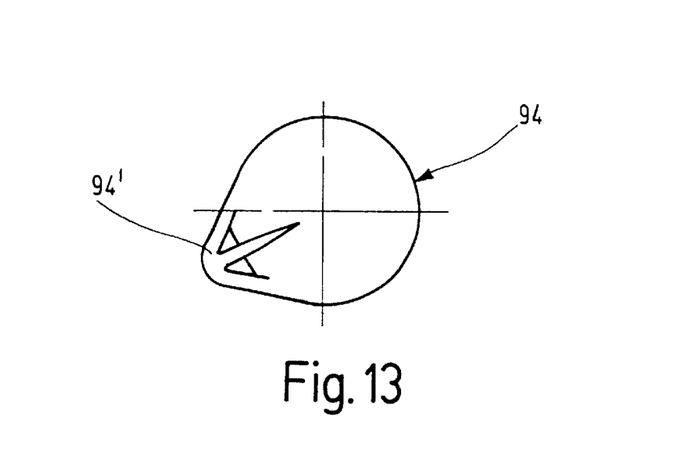
FIG. 13 shows a plan view of the lower cap in the direction of the arrow VI in FIG. 10.

A lower cap 94 having essentially the basic shape of a half lens is provided on the flat side with three pin-like spikes which are introduced with frictional engagement into corresponding blind holes or other recesses on the lower end side of the belt retainer 90. The lower end side of the belt retainer 90 is covered thereby. The lower cap 94 at the same time forms the free end of the belt retainer 90. On the side the lower cap 94 bears a projection 94' which, as seen from the central axis of the belt retainer 90, is offset relative to the holder 91 by approximately 30° in the circumferential direction.

Figure 11:
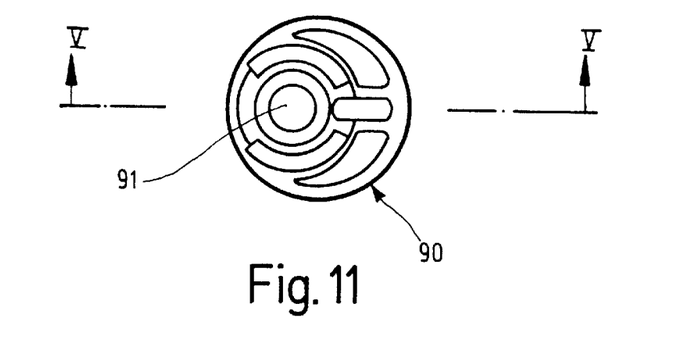
FIG. 11 shows a plan view of the belt retainer in the direction of the arrow IV in FIG. 10.
Figure 12:
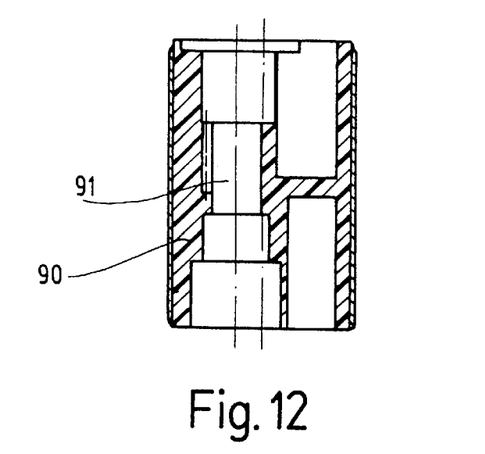
FIG. 12 shows a section through the belt retainer along the line V—V in FIG. 11.

From the upper end side of the belt retainer 90 an upper spring 96 is introduced into the holder 91, wound around the hoop 87 and on its lower end supported in a longitudinal groove in the holder 91. The upper end of the upper spring 96 is supported on the hoop 87, preferably on the plate 88 or its tooth 88'. The upper spring 96 is pretensioned in the circumferential direction and thus attempts to pivot the belt retainer 90 about the hoop 87. The distance between the holder 91 and that parallel line which is furthest away therefrom on the outside of the belt retainer 90 is greater than the distance between the end section of the hoop 87 and that section 87' of the hoop 87 which is situated in front of it. It is therefore not possible for the belt retainer 90 to be pivoted over the entire angular range because of the eccentricity, and the upper spring 96 attempts to bring the belt retainer 90 to bear against the section 87' of the hoop 87, to be precise, from the rear side of the child seat inward.

An upper cap 98 likewise with a half lens as the basic shape is placed onto the plate 88 and the upper end side of the belt retainer 90 and is fastened by two spikes placed into the belt retainer 90. The upper cap 98 which is made of plastic has a lateral slot and thereby surrounds the hoop 87.

The belt-retaining device 85 can be used in two different operating modes. In one operating mode use is made of the action just described of the upper spring 96 and of the eccentricity. In particular for smaller children, the normal three-point seatbelt of the rear-seat bench is advanced forward on the appropriate side of the child seat onto the lower cap 94 with a slight pull to the rear and upward. Because of the rounding of the cap 94, the seatbelt slips onto the belt retainer 90, remains attached to its rubber coating and carries along the belt retainer 90 counter to the force of the upper spring 96. The belt retainer 90 is detached from the section 87' of the hoop 87 in such a manner that a gap opens in between into which the seatbelt slides. If the seatbelt is released, the force of the upper spring 96 ensures that the belt retainer 90 pivots back again and clamps the seatbelt. If the child moves forward, the belt thus pulls forward and the clamping action increases so that the child is securely held in the child seat. The seatbelt can be put on using just one hand without the belt retainer 90 having to be grasped by the other hand.

In the other operating mode, use is made of the projection 94'. In particular for older children having more need of movement, the seatbelt, as just described, is first brought between the belt retainer 90 and the section 87' of the hoop 87. The belt retainer 90 is then pulled somewhat downward counter to the force of the lower spring 92 and pivoted until the projection 94' comes to bear against the section 87' of the hoop 87. Because of the eccentricity, there then exists between the belt retainer 90 and the section 87' of the hoop 87 a gap in which the seatbelt is situated. The gap is then closed upward and downward but laterally opened so that the seatbelt is surrounded, in this opening formed as a result, annularly and loosely by the hoop 87, the belt retainer 90 and the lower cap with the projection 94'. The belt retainer 90 is then released to such an extent that the lower spring 92 can press it upward. As it does so, the tooth 88' of the plate 88 engages into a recess on the upper end side of the belt retainer 90. This prevents a possible pivoting movement, caused by the force of the upper spring 96, of the belt retainer 90. The loosely inserted seatbelt is prevented by the projection 94' from sliding downward and from slipping out of the belt-retaining device 85. However, the child can move comfortably. On the other hand, the belt-retaining device 85 in no way obstructs the seatbelt in the event of being subjected to stress, for example, in the event of a crash.

By renewed pulling of the belt retainer 90 downward, the tooth 88' can again be brought out of engagement with the belt retainer 90, with the result that the upper spring is again effective and can again be transferred to the first operating mode.

In a modified embodiment, because of the material and shape of the hoop 87, the end section of the hoop 87 can be bent up elastically to a small extent. During the transfer to the second operating mode, the belt retainer 90 can thus be moved away somewhat from the section 87' of the hoop 87. The projection 94' can then be guided past this section 87' so that when the belt retainer 90 is released, the projection 94' on the rear side of the section 87' comes to bear against the section 87' and is held in this position by the upper spring 96. The lower spring 92 and the tooth 88' are omitted in this embodiment.

What is claimed is:

1. An adjustable child seat, comprising:

a backrest;

a seat-surface structure connected to the backrest, wherein the seat-surface structure at least partially defines a seat surface having a length extending in a longitudinal direction, wherein an adjustable portion of the seat-surface structure can be moved in substantially the longitudinal direction and secured relative to a second portion of the seat-surface structure that at least partially defines the seat surface; and a securing device that is in the region of the seat surface for releasably securing the adjustable portion of the seat surface relative to the second portion of the seat-surface structure, wherein the securing device itself at least partially defines the seat surface.

2. The child seat as defined in claim 1, wherein the adjustable portion of the seat-surface structure comprises a generally U-shaped piece that is guided by guide bushes such that the generally U-shaped piece can be moved within a region of displacement.

3. The child seat as defined in claim 2, wherein the securing device releasably secures the generally U-shaped piece relative to the second portion of the seat-surface structure.

4. The child seat as defined in claim 3, wherein the second portion of the seat-surface structure comprises side parts and the securing device releasably connects the generally U-shaped piece to at least one crosspiece running between the side parts of the seat-surface structure.

5. The child seat as defined in claim 1, further comprising a substructure that carries the seat-surface structure and is operative so that the seat-surface structure can be adjusted relative to the substructure so that the seat-surface structure is inclined with respect to the substructure and so that the inclination of the seat-surface structure can be adjusted.

6. The child seat as defined in claim 1, wherein the backrest can be folded forward relative to the seat-surface structure.

7. An adjustable child seat, comprising:

a backrest;

a seat-surface structure connected to the backrest, wherein the seat-surface structure defines a seat surface having a length extending in a longitudinal direction, wherein an adjustable portion of the seat-surface structure can be moved in substantially the longitudinal direction and secured relative to a second portion of the seat-surface structure that at least partially defines the seat surface, wherein the adjustable portion of the seat-surface structure comprises a generally U-shaped piece that is guided by guide bushes such that the generally U-shaped piece can be moved within a region of displacement, and wherein the second portion of the seat-surface structure comprises side parts; and a securing device that is in the region of the seat surface and that releasably connects the generally U-shaped piece to at least one crosspiece running between the side parts of the seat-surface structure to releasably secure the generally U-shaped piece relative to the second portion of the seat-surface structure.

8. The child seat as defined in claim 7, wherein a front end of the securing device comprises a socket for attaching the front end of the securing device to the generally U-shaped piece and a rear region of the securing device comprises a plurality of ribs for attaching the rear region of the securing device to the crosspiece.

9. The child seat as defined in claim 8, wherein the securing device comprises a ramp which rises from the rear region of the securing device to the front end of the securing device.

10. The child seat as defined in claim 8, wherein the securing device can be pivoted about the generally U-shaped piece with the socket as a bearing.

11. The child seat as defined in claim 10, wherein the pivoting of the securing device is restricted by at least one means for restricting selected from means provided on the seat-surface structure and means provided on the securing device.

12. The child seat as defined in claim 11, wherein the means provided on the seat-surface structure comprises a mat which is fixed in the seat-surface structure for the purpose of supporting padding.

13. An child seat for use with a seatbelt that is operative for traveling in a first pulling direction and a second pulling direction, the child seat comprising:

a seat-surface structure;

a backrest connected to the seat-surface structure; and a belt-retaining device carried by the backrest and operative in at least one operating mode to clamp the seatbelt in response to the seatbelt traveling in the first pulling direction and to release the seatbelt in response to the seatbelt traveling in the second pulling direction, wherein the belt-retaining device loosely surrounds the seatbelt in a second operating mode, and the belt-retaining device comprises a pivotable projection that engages a part of the belt-retaining device during the second operating mode so that the projection and the part of the belt-retaining device that is engaged at least partially form an opening for facilitating the loose surrounding of the seatbelt.

14. The child seat as defined in claim 13, wherein the belt-retaining device comprises at least one pivotable, eccentrically mounted belt retainer, and the pivotable projection is provided on a free end of the belt retainer.

15. An child seat for use with a seatbelt that is operative for traveling in a first pulling direction and a second pulling direction, the child seat comprising:

a seat-surface structure;

a backrest connected to the seat-surface structure; and a belt-retaining device carried by the backrest and operative in at least one operating mode to clamp the seatbelt in response to the seatbelt traveling in the first pulling direction and to release the seatbelt in response to the seatbelt traveling in the second pulling direction, wherein the belt-retaining device comprises a generally U-shaped supporting part which is arranged on the backrest.

16. The child seat as defined in claim 15, further comprising lateral supports that are provided on the backrest and define a height and a width, and which can be adjusted to vary at least one dimension selected from the height and the width.

17. The child seat as defined in claim 16, further comprising supporting means for supporting the lateral supports, wherein the generally U-shaped supporting part is fastened to the supporting means.

18. A child seat for use with a seatbelt that is operative for traveling in a first pulling direction and a second pulling direction, the child seat comprising:

a seat-surface structure;

a backrest connected to the seat-surface structure; and a belt-retaining device carried by the backrest and operative in at least one operating mode to clamp the seatbelt in response to the seatbelt traveling in the first pulling direction and to release the seatbelt in response to the seatbelt traveling in the second pulling direction, wherein the belt-retaining device comprises at least one pivotable, eccentrically mounted belt retainer.

19. The child seat as defined in claim 18, wherein the belt-retaining device is operative to cooperate with the seatbelt, while the seatbelt is traveling in the second direction, so as to allow the seatbelt to pass into a gap that is defined by the belt-retaining device, whereby the seatbelt can be introduced into the belt-retaining device without the belt-retaining device having to be actuated by hand.

20. The child seat as defined in claim 18, wherein the belt-retaining device comprises a generally U-shaped supporting part which is arranged on the backrest.

21. The child seat as defined in claim 18, wherein the belt-retaining device loosely surrounds the seatbelt in a second operating mode.

22. The child seat as defined in claim 18, wherein the belt retainer is a left belt-retainer that is positioned on a left side of the child seat, and the belt retaining device further comprises a right belt retainer that is substantially similar to the left belt retainer and is positioned on a right side of the child seat.

23. The child seat as defined in claim 18, wherein the belt retainer comprises a rounded free end.

24. The child seat as defined in claim 18, wherein the belt retainer is spring-loaded in a pivoting direction and is thereby biased to pivot relative to and toward a part of the belt-retaining device.

25. The child seat as defined in claim 18, wherein when the seatbelt bears against the belt retainer, the seatbelt carries along the belt retainer in response to the seatbelt being pulled.

26. The child seat as defined in claim 25, wherein the belt retainer comprises an outer surface and at least part of the outer surface of the belt retainer is substantially frictional.

* * * * *